United States Patent
Dere et al.

(10) Patent No.: US 7,363,318 B1
(45) Date of Patent: Apr. 22, 2008

(54) METHOD AND APPARATUS FOR MANAGEMENT OF AN AUTOMATED LICENSE INSTALLATION

(75) Inventors: William Dere, Alameda, CA (US); Sue W. Dere, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 560 days.

(21) Appl. No.: 09/621,400

(22) Filed: Jul. 21, 2000

(51) Int. Cl.
*G06F 7/00* (2006.01)
*G06F 17/00* (2006.01)
*G06F 9/445* (2006.01)

(52) U.S. Cl. .................. 707/104.1; 707/10; 717/174
(58) Field of Classification Search .......... 384/4, 384/25; 395/710–713; 709/200–221; 710/5–10; 707/104
See application file for complete search history.

(56) References Cited

U.S. PATENT DOCUMENTS

| | | | | |
|---|---|---|---|---|
| 5,790,664 A | * | 8/1998 | Coley et al. ............ | 380/4 |
| 6,006,035 A | * | 12/1999 | Nabahi .................. | 395/712 |
| 6,067,582 A | * | 5/2000 | Smith et al. ............ | 710/5 |
| 6,108,420 A | * | 8/2000 | Larose et al. ........... | 380/4 |

OTHER PUBLICATIONS

FLEXlm End User Manual, GLOBEtrotter Software, Inc., Oct. 1996, pp. 82.

* cited by examiner

*Primary Examiner*—Apu Mofiz
*Assistant Examiner*—Susan Chen
(74) *Attorney, Agent, or Firm*—Fay Kaplun & Marcin, LLP (57) ABSTRACT

A method and apparatus for management of an automated license installation is presented. An automated license daemon runs on a server waiting for transmissions/connections from a client-based Setup program. The Setup program utilizes a tunneling agent to make a socket connection with the automated license daemon. Upon such transmission/connection, the automated license daemon begins a thread for each license request, each thread creating a number of SQL queries with information that is received from the Setup program. These SQL queries are sent to an automated license management database for validation. After validation, a license file is returned from the automated license database to the automated license daemon and then back to the Setup program client.

18 Claims, 7 Drawing Sheets

METHOD AND APPARATUS FOR MANAGEMENT OF AN AUTOMATED LICENSE INSTALLATION

FIELD OF THE INVENTION

The present invention relates to improvements to a method and apparatus for the management of an automated license installation, and more particularly, to a method and apparatus for an automated license daemon and database interface in a three-tiered client server management system allowing for automated license installation.

BACKGROUND INFORMATION

In many cases, before programs and/or applications can be downloaded over the Internet by a user/client, that user/client is often required to provide personal information to allow a validation of sorts to use the program/application. This is especially true where the program and/or application is proprietary. Collection of such personal information, via the Internet, telephone, or by some other means, often requires manual entry of the information, with such manual entry prone to errors.

Where the program/application is proprietary and a license is required for its use, errors from manual entry of data can cause disruptions and/or delays in the use of the program/application. Correction of such disruptions and/or delays must also be done manually, is time-consuming and often cannot be done at night or on the weekends. Accordingly, such disruptions and/or delays are injurious to licensor/licensee business relations.

SUMMARY OF THE INVENTION

According to the present invention, both a method and an apparatus of/for managing an automated license installation for user computing equipment is provided. According to the method of the present invention, at least one license installation option is provided to the user/client and license information of the user/client server is retrieved from a license database. The user/client server is queried on a configuration of the retrieved license information and the retrieved license information is confirmed with the user/client server. Also according to the method of the present invention, a license file relating to the confirmed license information is installed. According to the apparatus of the present invention, a Setup program is provided which resides on the user/client server. Also provided is an automated license Daemon program with which the Set-up program communicates, and a license database on which is stored license information and from which at least one license can be retrieved and then installed on the user/client server.

The present invention, including its features and advantages, will become more apparent from the following detailed description with reference to the accompanying drawings.

DETAILED DESCRIPTION

FIGS. 1 through 7 show a method and apparatus for an automated license installation by which a Setup program residing on a user/client computing system connects to an automated license Daemon and database residing on a program/application download server. It is to be understood, of course, that the Setup program may be programmed in any computer language such as, for instance, C, C++, and TCL.

According to the present invention, the Setup program uses a web server tunneling agent to directly connect through a bi-directional socket connection with a program/application download server without the use of a web browser or the need to go through a third-party server. HTTP tunneling is well-known in the art, and allows messages and web pages to be passed back and forth through a dedicated Internet server port. A direct socket connection through the use of HTTP tunneling allows a customer to configure downloading based on a data store that is in an Enterprise Resource Planning (ERP) system. Further, a user is able to use a set-up graphical user interface to configure and receive an ERP generated license file that is tied to the current host, or a license file that allows the host to serve "floating" licenses.

The Setup program incorporates a code to unlock and install programs/applications from a CD ROM or other media, or to request programs/applications from the program/application download server. The program/application download server includes, in this case, an automated license Daemon. Upon a bi-direction socket connection through the HTTP tunneling operation, a request is sent and validated by a connected license database. Upon receipt of the license download request and validation, the Setup program residing upon the user/client computing system will receive a license file (i.e., a license to run/use a corresponding software application), and a new configuration is then entered into the ERP database.

The Setup program acts as a client program which sends user information (e.g., such as user name, company name, license(s) assigned, hostName, host ID, etc.) to the program/application download server and receives back items (e.g., such as error message(s), license file, etc.). The automated license Daemon, on the other hand, is a multi-threaded program running continuously on the program/application download server, in a fashion that is bootstrapped to the server so that the Daemon runs whenever the server reboots. The automated license Daemon is responsible for, among other things: receiving a request type from the Setup program; forwarding that request type to the appropriate handler threads; sending filtered information in the form of SQL queries to the license database; receiving a license file or error codes from the license database (after validation); sending the license file to the Setup program; and sending an error message to the Setup program if validation fails.

Figure 1:
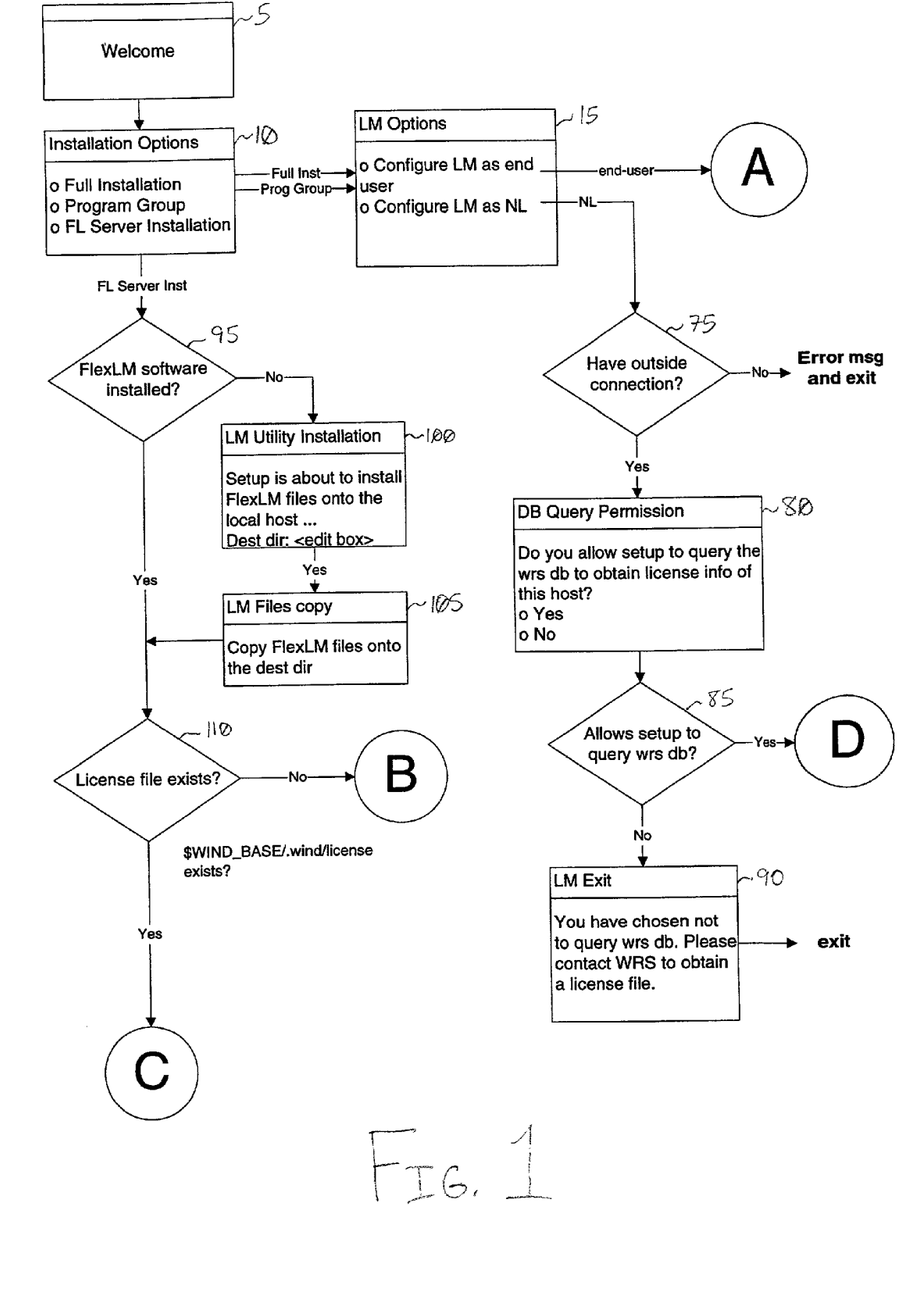
FIGS. 1, 2, 3, 4, 5 and 6 illustrate a flow chart of a Setup program incorporating code which allows a customer to configure and request licenses from an automated license Daemon, according to an embodiment of the present invention.

Referring now to FIG. 1, a user wishing to utilize the automated license installation will start the Setup program on the user/client's computing system and in step 5 will see the welcome screen of the Setup program. In step 10, the Setup program will offer the user three license management installment options. The first option is a full installation option, the second option is a program group installation, and the third option is a floating license server installation option.

Should the user decide to choose either the full installation option or the program group option, in step 15 license management options are presented. In this step the user will be given the option to configure license management for a single end-user on a network or to configure license management for a node-locked license use. Configuration for the single-end user on the network would allow a local server (i.e. at the customer site) to distribute the appropriate licensed software, while configuration for a node-locked license would indicate restriction to one machine without a network.

Figure 2:
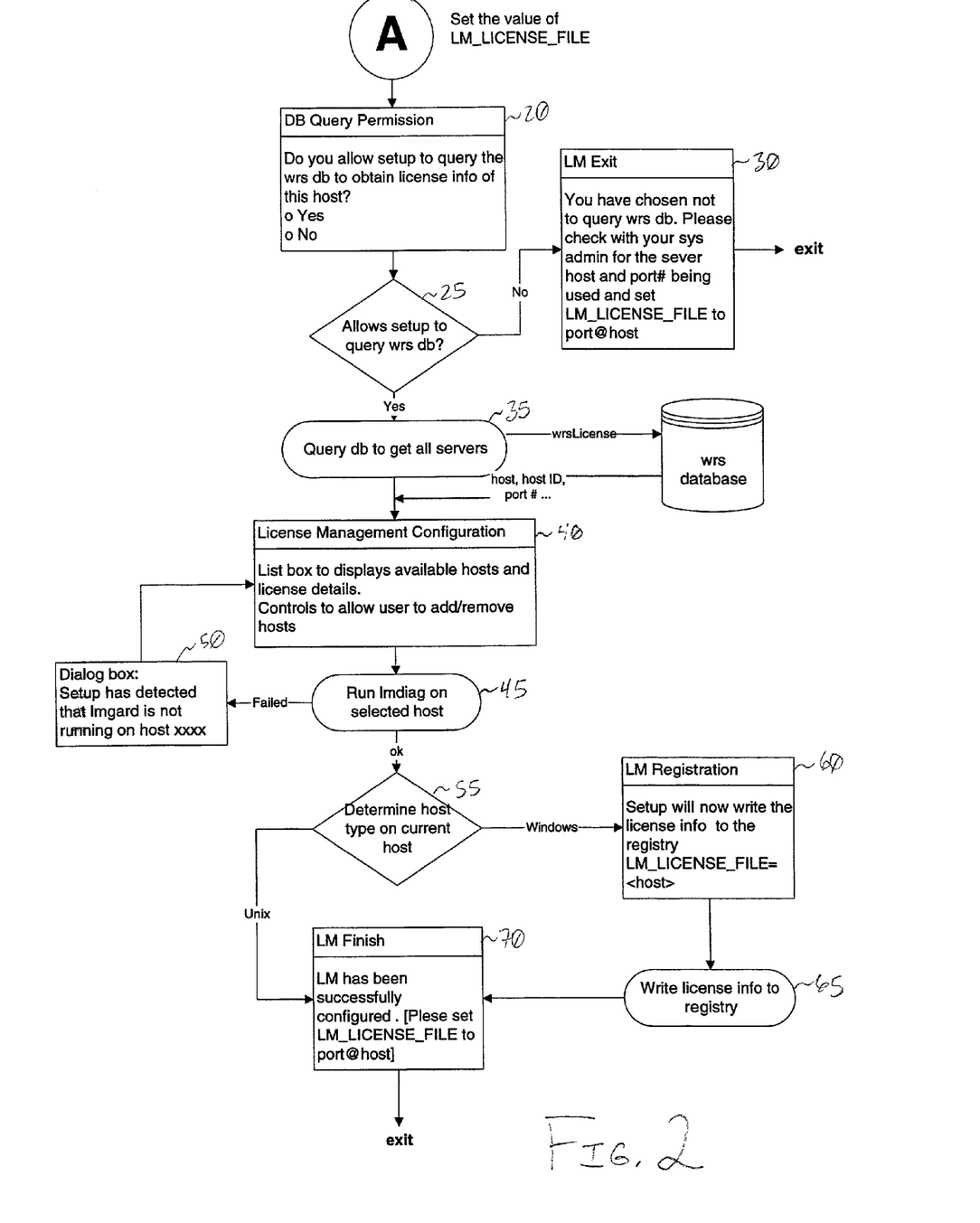

Referring now to FIG. 2, if the user chooses to configure license management for a single end user on a network, the code to determine the contents of the license management license file variable (e.g., LM_LICENSE_FILE) is entered. In step 20 then, the user is prompted for permission to query the license database. In this step, the user is being asked whether to allow the Setup program to query the program/application download server to obtain license information regarding the user's computing equipment. If in step 25 the user does not wish to allow the Setup program to conduct such a query, in step 30 the license management application will exit. Additional instructions can be given to check with a system administrator to obtain the user's server host and port number being used so that the appropriate license management license file variable can be set to the proper setting. If, however, in step 25 the user allows the Setup program to query the program/application download server, in step 35 the Setup program queries the license database to get all authorized local server hosts (e.g., more than one server may be involved as more than one project utilizing licensed software may be involved). As shown in this figure, such query is made of the license database, which returns license configuration information such as host ID's, port numbers, host names, products licensed, licenses used, etc., that is stored in the database.

Upon retrieval from the license database of the pertinent information, in step 40 the Setup program runs a license management configuration page. Configuration consists of a list box displaying available hosts and license details, and allows the user to control adding and/or removing of hosts. In step 45, the license management diagnostic program (lmdiag) is run on the selected host. If the license management diagnostic program fails in step 50, a dialog box presents that Setup has detected that a license management daemon is not running on the selected host, and the Setup program returns to the license management configuration as in step 40. If, on the other hand, the license management diagnostic program run of step 45 is okay, in step 55 a determination of the type of host of the selected host is conducted. If the current host is determined to be a Windows® type host, in step 60 license management registration begins. The Setup program then writes the license information into the Windows® registry of the selected host as is accomplished in step 65. Upon accomplishment of writing license information to the registry, or upon a determination that the current host is a Unix® type host, in step 70 license management is finished. The user is presented with a message that license management has been successfully configured. On Unix® hosts, a message reminds the user to set the license management license file environment variable (e.g., LM_LICENSE_FILE), while on Windows® hosts, the license management license file environment variable is set in the Windows® registry. The program then exits. It is to be understood, of course, that the host types utilized herein are exemplary, and that other types of hosts may be utilized, such as Linux®, Mac®, etc . . .

Figure 5:
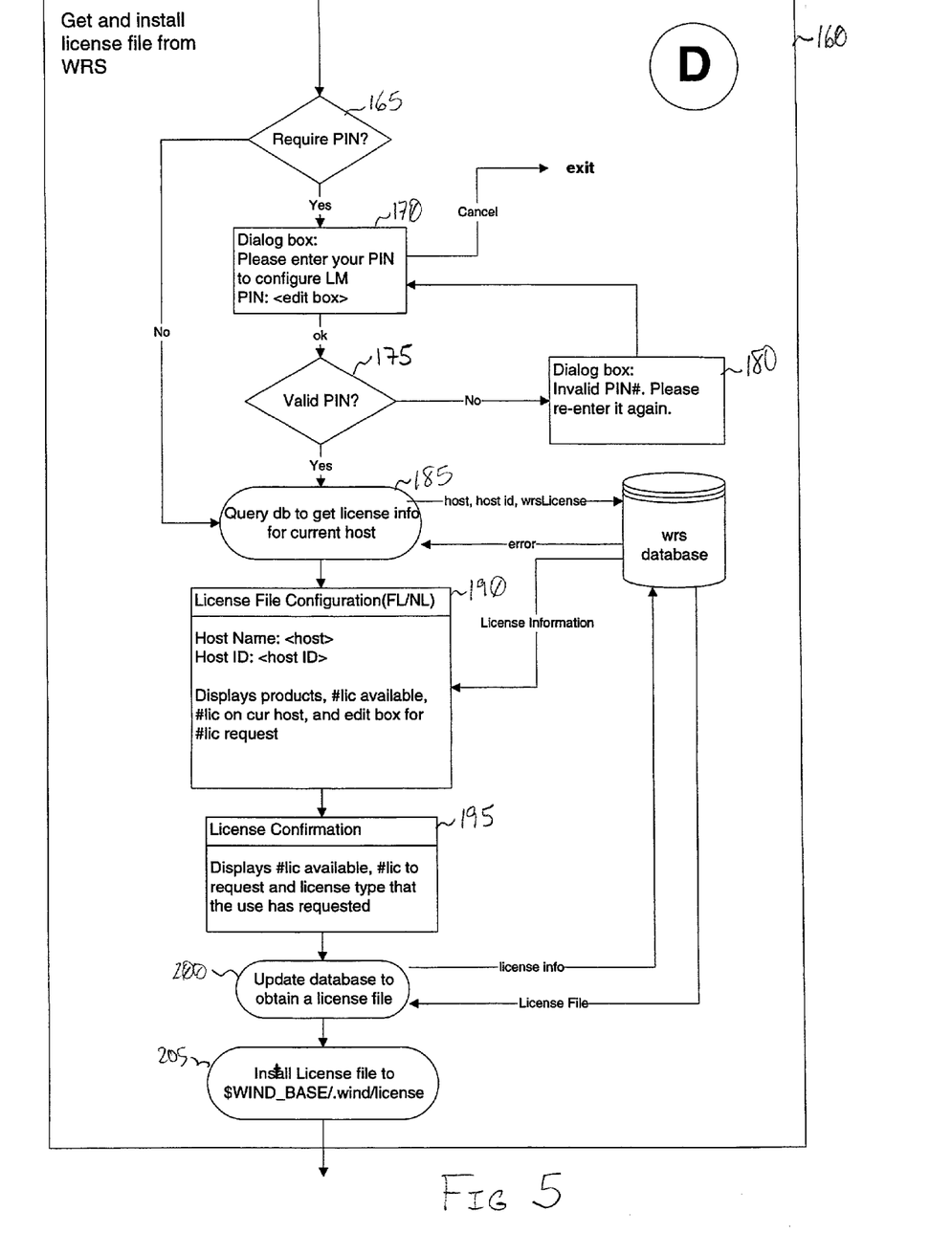

Referring back to FIG. 1, if in step 15, however, the user chose the license management option of a node locked variety, in step 75 it is determined whether or not an outside connection over the Internet exists. If no outside Internet connection exists, an error message is presented and the Setup program exists. Alternatively, if an outside Internet connection is determined to exist, in step 80 the Setup program asks for permission to conduct a database query. In this case, the Setup program is asking the user to allow the Setup program to query the program/application download server to obtain license information for the user's equipment in step 85. If the user does not allow such a query, in step 90 the license management application exits according to an exit menu. Such an exit menu may include an instruction to manually contact the program/application download server license administrator(s) to obtain the correct license file. If the user does allow such a query, the license management application continues as shown in FIG. 5, which steps will be described in more detail further below.

Continuing, however, with a description of the Setup program in FIG. 1, if, after the welcome screen in step 5, the user chooses in step 10 the floating license server installation option, in step 95 a determination as to whether flexible license management software (e.g., FlexLM®) is installed is made. If the flexible license management software is not installed, in step 100 a license management utility installation occurs. The user is queried as to the destination directory into which the Setup program should install the flexible license management software files onto the local host. Upon determination of the directory by the user in step 105 the license management application files are copied into the destination directory.

Upon installation of the flexible license management software, or if in the case that the flexible license management software was pre-installed, in step 110 a determination as to whether the license file exists is made.

Figure 3:
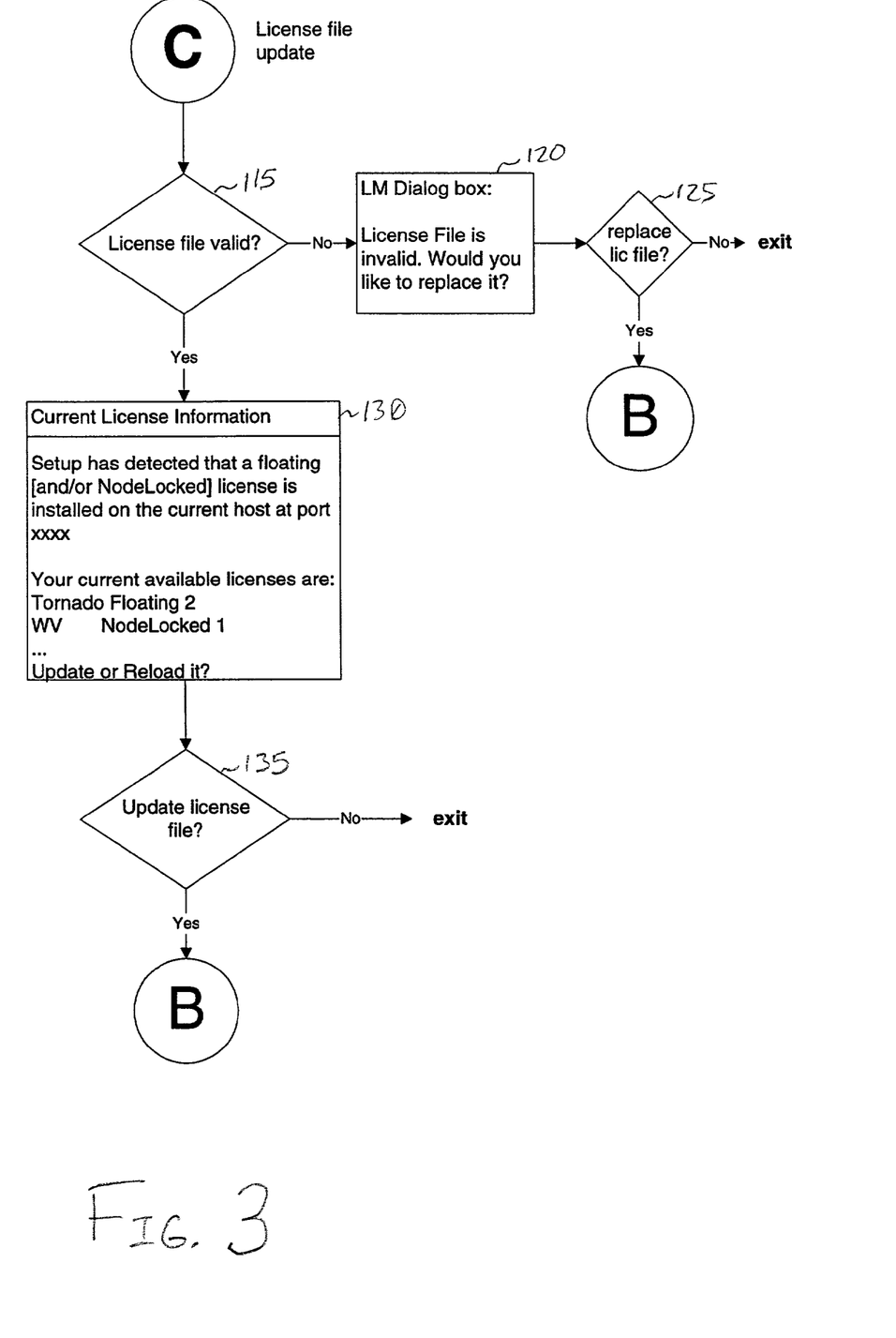

Referring now to FIG. 3, if the license file exists, in step 115 a determination is made as to whether the license file is valid. That is, a determination is made as to whether or not the license file needs to be updated. If the license file is not valid, in step 120 a license management dialog box is created in which the user is informed that the license file is invalid and is asked whether the user would prefer to replace it in step 125. If the user does not wish to replace the license file, the program exits. If the user does in fact wish to replace the license file the Setup program continues with the application as if the license file had not existed, as will be described in further detail below in reference to FIG. 4.

Alternatively, in step 115, if the license file is determined to be valid, in step 130 current license information is checked. Here the Setup program will detect whether a floating and/or node locked license is installed on the user equipment. Such information will be presented to the user, and the user will be asked whether or not to update or reload the license in step 135. If the user does not wish to update/reload the license file, the program exits. If, as before, the user chooses to update the license file, programming continues as if there was no license file uploaded on the server.

Figure 4:
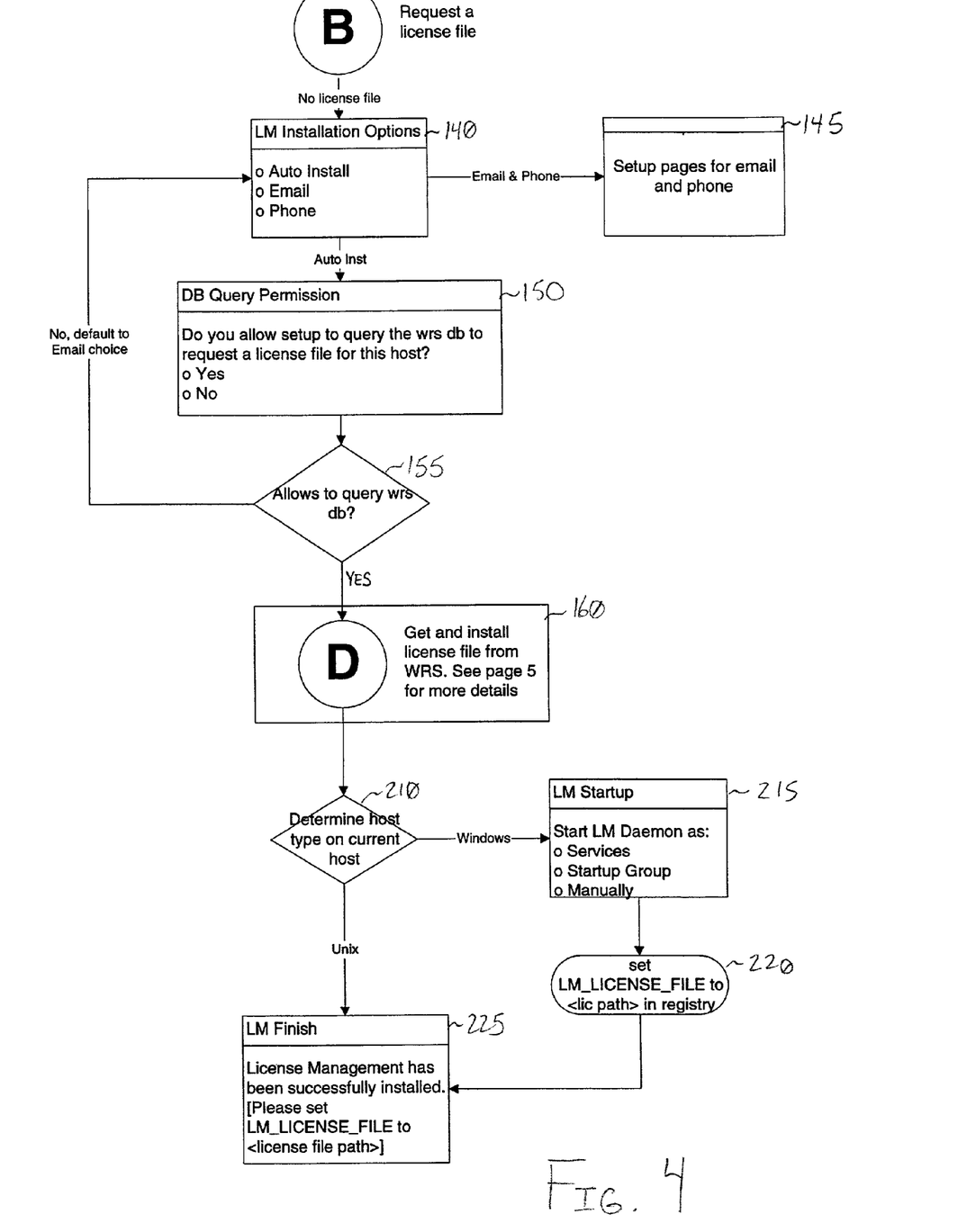

Referring now to FIG. 4, in the instance where there is no license file located on the server (as determined in step 110 of FIG. 1) or the user desires to update/reload and/or replace the license file (as determined in steps 125 and 135, respectively, of FIG. 3), in step 140 the Setup program presents the license management installation options to the user. These options consist of an automatic installation, an e-mail installation, and/or a manual installation option. If the user chooses either an e-mail and/or manual installation option, in step 145 the Setup program presents the user with setup pages for e-mail and/or manual installation. If, however, the user chooses the automatic installation option, in step 150 the Setup program requests permission from the user for a database query. Thus the user is asked to allow the Setup program to query the program/application download server to request a license file for the host in step 155. If the user chooses not to allow the Setup program to query the server, the Setup program returns to step 140 and defaults to the e-mail installation option of the license management installation options.

If, on the other hand, the user gives permission to allow such query of the database, in step 160 a series of steps are conducted, as shown in FIG. 5, to retrieve and install the license file from the program/application download server. As mentioned above in regard to step 85 of FIG. 1, such installation steps of the license file also occur in response to an affirmative answer with respect to a permission query to allow the Setup program to query the database.

Accordingly, referring now to FIG. 5, the procedure for the Setup program to retrieve and install a license file from the program/application download server is shown. In step 165 a determination of whether a pin number is required for security is made. If a pin number is required, in step 170 the user is presented with a dialog box requesting the pin number to configure the license management installation. If no pin number is entered, or the user desires to cancel, the Setup program exists. If, however, a pin number is entered in step 175, a determination of whether the pin number is valid is made. If in step 180 it is determined that the pin number is invalid, the user is presented with a dialog box stating that the pin number is invalid and to please re-enter the pin number again, as the Setup program returns to step 170.

If it is determined in step 175 that the pin number is valid or if it is determined in step 165 that a pin number is not required, in step 185 the Setup program queries the license database to get the license information for the computing equipment running the setup program. This consists of sending a host ID, customer license number, other relevant data, and a request code to the license database. The program/application download server either returns an error message to the Setup program or returns the license information.

If the license information is returned, in step 190 a license configuration entry form, either for floating or node locked license management software configuration modes is displayed for the user to fill out. The license configuration entry form consists of a display of the available license products, the number of licenses available, the number of licenses currently residing on the host equipment and an edit box for any license requests. In step 195, license confirmation occurs. License confirmation consists of displaying a summary of the license configuration requested by the user and how many licenses for each product is to be allocated for this machine. In step 200, the updating of the license database to obtain the license file occurs. This consists of sending license information to the license database and returning a license file. Accordingly, in step 205 the license file is installed to the appropriate location in the user/client computing system.

Referring back to FIG. 4, the Setup program, having retrieved and installed the appropriate license file from the program/application download server and license database, in step 210 determines the type of host that the current host is. If it is determined that the current host is a Windows® type host, in step 215 license management startup is conducted. The license management Daemon may start as a service, a startup group, and/or a manual startup. In step 220, the appropriate registry variable is set. Upon proper setting of the file in the registry, or if the current host is determined to be a Unix® type host, in step 225 the license management finishes. In this case, a dialog box is presented to the user that states that the license management installation has been completed successfully and requests the setting of the license management license file path.

The user has now been provided with the opportunity to retrieve, install, and successfully set up a license from the program/application download server and license database. Having completed the foregoing steps, dependent upon the initial installation option, the user may utilize the licensed program.

Figure 6:
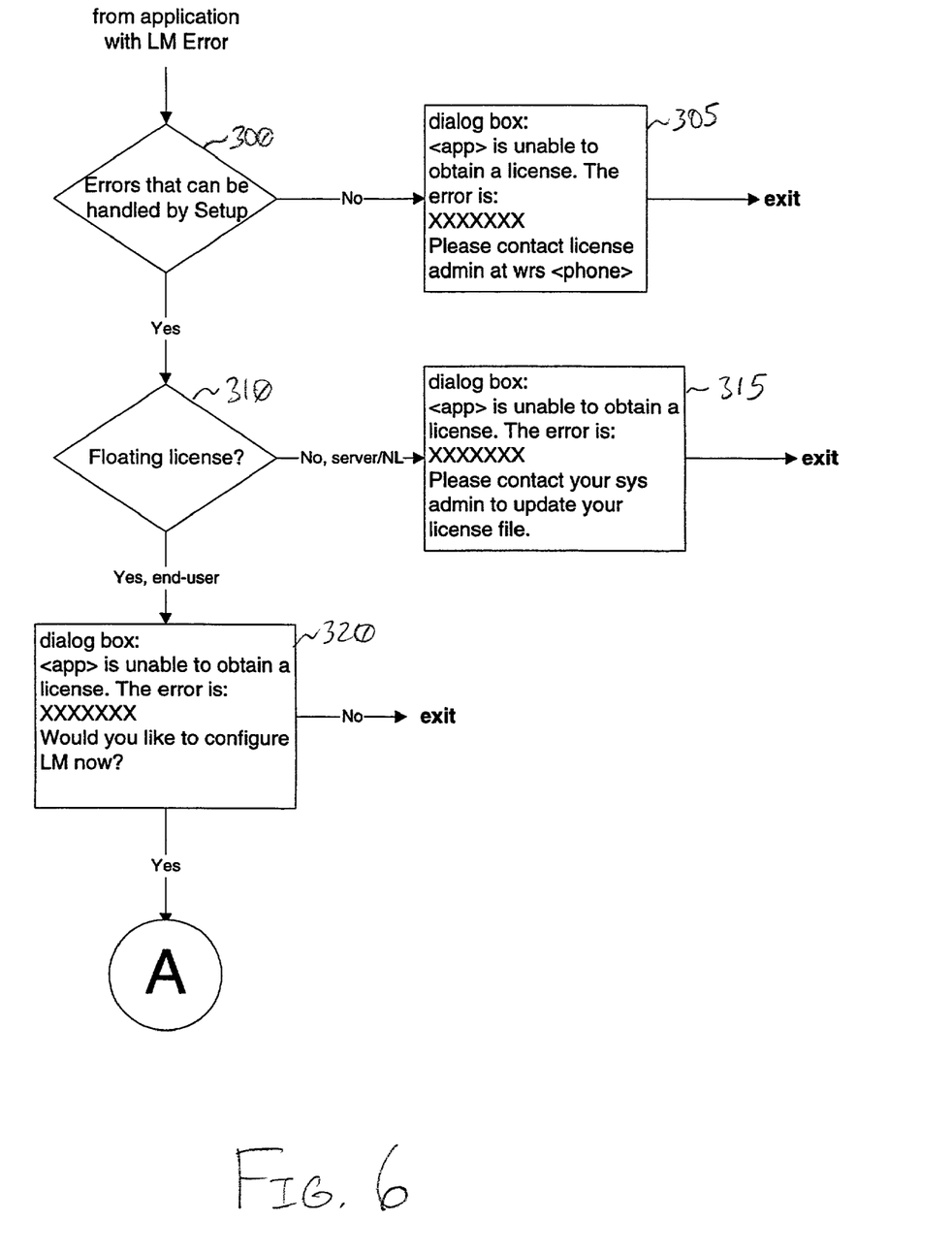

Referring now to FIG. 6, the error handling facility that is embedded as a library within a license managed application program is shown. Thus, when a licensed application encounters a license management error, or the Setup program application detects a license management error, an error processing operation occurs. If an error is determined to have occurred, in step 300 a determination of whether the error can be corrected by the Setup program is conducted. If the error cannot be corrected by the Setup program, in step 305 the user is presented with a dialog box stating that the current application is unable to obtain a license and identifying the particular error. The user is further instructed to contact the license administration at a particular address and/or phone number. Accordingly, the Setup program/licensed application will then exit.

If it is determined that the error can be corrected by the Setup program, the Setup program is invoked and run. In step 310 a determination of whether a floating license has been and/or is installed is determined. If it is determined that installation is a floating license server problem (e.g., there is no server running or a license file is not installed) or an invalid node locked license installation, in step 315 a dialog box is presented to the user stating that the current application is once again unable to obtain a license and identifying the particular error. Once again, as in step 305, the user is instructed to contact their own system administrator. The Setup program will then exit.

If it is determined in step 310 that the license is a floating license and that the license installation is one of an end user, in step 320 a dialog box is presented to the user stating that the current application is unable to obtain a license and that the error is (whatever the error determined to be). The user is further requested as to whether the user would like to configure the license management now. If not, the Setup program exists. If so, processing continues in step 20 as shown in FIG. 2.

Figure 7:
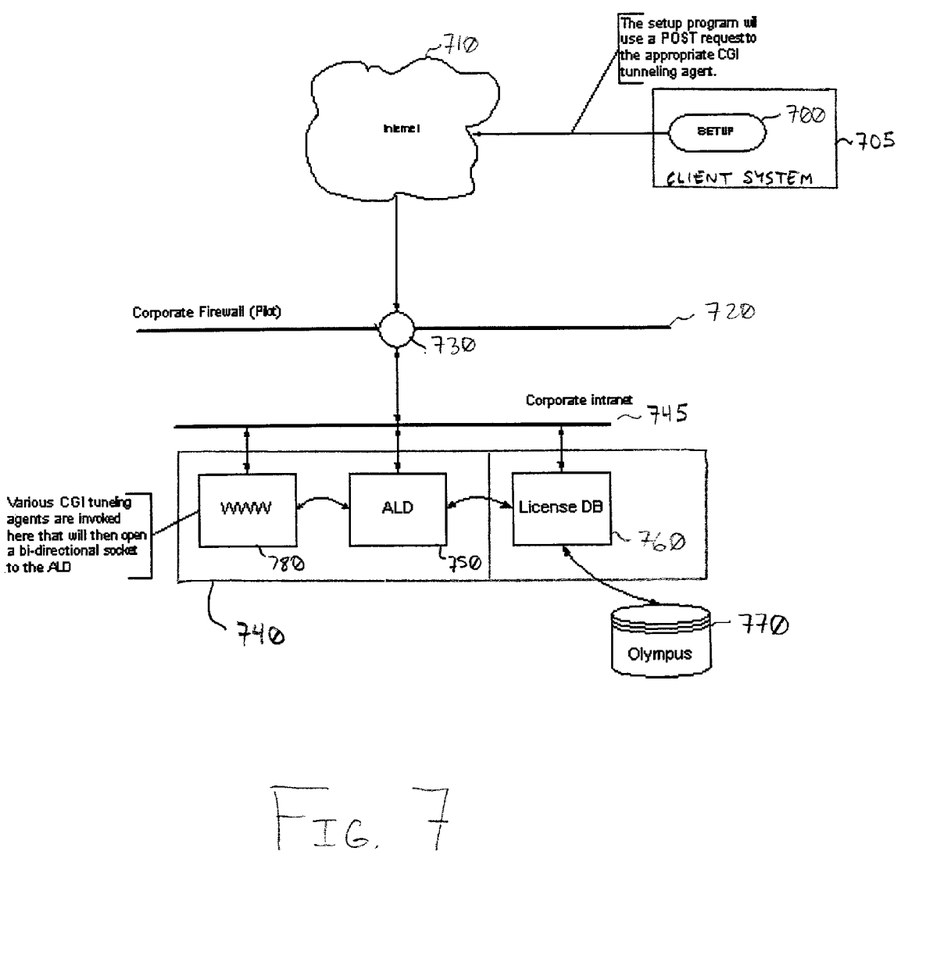
FIG. 7 illustrates an apparatus by which a client may request and receive a license download through the Setup program from the automated license Daemon, according to an embodiment of the present invention.

Referring to FIG. 7, a system using the automated license management Daemon and license database interface within the automated license management installation process is shown. A Setup program 700 resides on a user/client computer system 705. The Setup program communicates through network 710 (e.g., the Internet/World-Wide-Web) to the program/application download server 740 by means of a post request to the appropriate web-server tunneling agent.

Such request is sent through the network 710 and through a corporate firewall 720 to a port 730. Port 730 is a port specifically reserved for HTTP protocol requests and responses. Firewall 720 filters all requests except through ports handling HTTP and FTP protocol message traffic.

The Setup program post request is passed through a corporate Intranet 745 to the various corresponding components of the program/application download server 740. These components consist of the license management Daemon 750, the license installation database 760, a corporate database 770 (which may, for example, correspond to an Oracle® or Olympus® database) and various CGI tunneling agents 780. The license management Daemon 750 formats the Setup program's 700 request to the license installation database 760. An application of database 760 then handles the request from the license management Daemon 750 and returns the appropriate reply. It is to be understood, of course, that the various components of server 740 are not restricted to residing solely on the server and may in fact reside elsewhere (e.g., on other serves or as stand-alone components).

As access to the license installation database 760 by the Setup program 700 is in effect direct, the program can make changes to the license installation database 760. On the other hand, however, changes to the corporate database 770 are made manually by sales, license, and key administrators. For system integrity, the changes in each database must be synchronized in the other such that transactions made on either one are replicated in the other, and that manual changes to the corporate database 770 itself are reflected back to the license installation database 760.

As modifications can be made to the license management configuration in either the automated license installation database 760 or the corporate database 770, information in the two databases 760, 770 is kept consistent with each other through a synchronization strategy. Such database synchronization strategy includes: a conflict detection and conflict resolution methodology using a time stamp sequencing; validation as a prerequisite to any license database update; a proactive notification process; a matchback methodology to each synchronization source using an identical unique ID value of the system; and a second chance logic methodology. The component of the database synchronization strategy that utilizes the matchback methodology to each synchronization source utilizing the same unique ID value of the system operates, for instance, utilizing a field identifier in which any update made in a license record that exists in both the license installation database and corporate database, will ensure that a change is entered into the correct row in each database. A change/transaction is passed between the databases utilizing the field ID value to access the record. For example, a matchback methodology utilizing a unique ID in the case where a table in the corporate database (e.g., a "wrslp_license_keys" table) is done through an accompanying identification field (e.g., a "wrslp_license_key" ID field). An update in this example is passed utilizing the ID value to access the record.

Alternatively, a matchback methodology in an insert situation in which there are independent ID's to access a record uniquely in all systems involved means there is no co-dependency from ID assignment. That is, if the "wrslp_license_key" ID were the unique ID used in both databases, every insert situation would require that the inserting database retrieved the next value from a pool common to both databases. Moreover, at synchronization time, there could be the risk of a duplicate ID error.

The second chance logic component of the database logic component of the database synchronization strategy is triggered when the update to the site fails because of an error other than a data error. A connection failure would cause second chance logic to kick in. This facility writes out a transaction to be used in re-submission of the modification. During the re-submission time-stamp sequencing logic is used to determine if the transaction should be allowed to go through or be inactivated and flagged for administrators' attention.

With respect to the exemplary embodiment according to the present invention, a user/client now has the ability to directly access a program/application download server through HTTP tunneling without recourse of a third party web server and use of a web browser. Accordingly, such communication and downloading is far more timely and secure.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method of managing an automated license installation on a client computing system, the method comprising the steps of:
retrieving license information of the client computing system from a license database located on a remote server;
receiving a selection of a configuration of the retrieved license information;
confirming the configuration of the retrieval license information on the client computing system; and
receiving one of a license file relating to the confirmed configuration of the retrieved license information and an error message.

2. The method according to claim 1, further comprising the step of:
requiring an entry of a valid PIN number.

3. The method according to claim 1, further comprising the step of:
requiring an affirmative permission of the client computer system before retrieval of license information from the license database.

4. The method according to claim 1, further comprising the step of:
determining whether a flexible license management utility software is installed on the client computing system, and installing the flexible license management utility software on the client computing system if the flexible license management utility software is determined as not being installed on the client computing system.

5. The method according to claim 1, further comprising the step of:
updating the license database based on the configuration of the retrieved license information.

6. The method according to claim 1, further comprising providing at least one license installation option on the client computing system:
wherein the at least one license installation option includes at least one of:
a full license installation;
a program group installation; and
a floating license installation.

7. The method according to claim 1, further comprising the step of:
   determining an operating system of the client computing system.

8. The method according to claim 7, further comprising the step of:
   configuring the operating system of the client computing system for the automated license installation by setting an environment variable of the operating system.

9. The method according to claim 1, further comprising the steps of:
   determining whether a previously installed license file is valid; and
   performing one of an updating operation and a replacement operation with respect to the previously installed license file.

10. The method according to claim 9, further comprising the step of:
    querying the client computing system on whether one of the updating operation and the replacement operation is to be performed with respect to the previously installed license file.

11. The method according to claim 1, further comprising the step of:
    determining if a network connection exists to the client computing system.

12. The method of claim 1, further comprising sending a message requesting license information.

13. The method of claim 12, wherein the message includes at least one of a host ID, license number, and request code.

14. The method of claim 1, wherein the retrieved license information includes at least one of available licensed products, host ID information, port number information, number of licenses available and number of licenses currently installed.

15. A system for managing an automated license installation on a client computing system comprising:
    a setup program which resides on the client computing system, the setup program configured to send post requests containing user information using hypertext transfer protocol (HTTP) over a network to an HTTP port;
    a tunneling agent which resides on a remote server system accessible via the network and having the HTTP port and a firewall, the tunneling agent configured to receive the post requests from the HTTP port;
    an automated license daemon program which resides on the remote server system, the automated license daemon configured to receive the user information from the tunneling agent; and
    a first database which resides on the remote server system and on which is stored license information and a license file, the first database configured to receive a request from the automated license daemon program and return a reply, the reply including one of the license information, the license file, and an error message;
    wherein the automated license daemon is further configured to send a reply HTTP message based on the reply to the setup program over the network using the HTTP port.

16. The system according to claim 15, wherein the setup program is further configured to install the license file on the client computing systems when the setup program receives the license file.

17. The system according to claim 15, further comprising:
    a second database on which resides a master copy of license information and license file from which an extract is made and becomes the source for the first database.

18. The system according to claim 17, wherein the information on the second database and the first database are updated independently and then synchronized.

* * * * *